United States Patent
Fields (10) Patent No.: US 6,207,593 B1
(45) Date of Patent: Mar. 27, 2001

(54) ASPHALT COATED MAT

(75) Inventor: John R. Fields, 22626 - 120$^{th}$ E., Sumner, WA (US) 98309

(73) Assignee: John R. Fields, Tacoma, WA (US)

( * ) Notice: Subject to any disclaimer, the term of this patent is extended or adjusted under 35 U.S.C. 154(b) by 0 days.

(21) Appl. No.: 09/035,437

(22) Filed: Mar. 5, 1998

Related U.S. Application Data (60) Provisional application No. 60/040,093, filed on Mar. 7, 1997, now abandoned.

(51) Int. Cl.$^7$ ...................................................... B32B 27/04
(52) U.S. Cl. ............................ 442/86; 442/164; 442/181; 428/337; 428/339; 428/340
(58) Field of Search .................... 428/337, 339, 428/340; 442/86, 164, 181

(56) References Cited

U.S. PATENT DOCUMENTS

| | | | |
|---|---|---|---|
| 3,741,856 | 6/1973 | Hurst | 161/88 |
| 3,753,938 | 8/1973 | Montague et al. | 260/28.5 D |
| 3,937,640 | 2/1976 | Tajima et al. | 156/71 |
| 4,368,228 | 1/1983 | Gorgati | 428/110 |
| 4,420,524 | 12/1983 | Gorgati | 428/110 |
| 4,421,581 | 12/1983 | Olsen | 156/71 |
| 4,521,478 | 6/1985 | Hageman | 428/287 |
| 4,599,258 | 7/1986 | Hageman | 428/140 |
| 4,668,315 | 5/1987 | Brady et al. | 156/71 |
| 4,692,350 | 9/1987 | Clarke et al. | 427/138 |
| 4,837,095 | 6/1989 | Hageman | 428/287 |
| 5,100,715 | 3/1992 | Zimmerman et al. | 428/147 |
| 5,169,690 | 12/1992 | Zimmerman et al. | 427/389.8 |
| 5,273,683 | 12/1993 | Krivohlavek | 252/351 |

FOREIGN PATENT DOCUMENTS

| | | | |
|---|---|---|---|
| 2262081 | 2/1975 | (FR) | C08L/95/00 |

*Primary Examiner*—Helen L. Pezzuto
(74) *Attorney, Agent, or Firm*—Brown, Raysman, Millstein, Felder & Steiner, LLP (57) ABSTRACT

Method and apparatus for production of asphalt coated sheets comprising materials highly prone to distortion under heat, including polyester and similarly deformable materials, in a coating machine comprising a mat puller adapted to pull the mat at a selectable rate, a coater, and a metering device. The metering device is optionally adapted to pull the mat at a selectable rate. The mat is pulled through the coater and coated with asphalt heated to 250° F. to 500° F., while the rates at which the mat puller and metering device pull the mat are independently and/or jointly adjusted to such that coated sheet may be produced at rates of more than 200 feet per minute, without wrinkling or necking in the mat.

8 Claims, 3 Drawing Sheets

ASPHALT COATED MAT

This application claims the benefit of U.S. provisional patent application Ser. No. 60/040,093, filed Mar. 7, 1997, and entitled Asphalt Coated Polyester Mat, now abandoned.

TECHNICAL FIELD

The invention relates to method and apparatus for making novel roofing and waterproofing membranes. More particularly, it relates to method and apparatus for making asphalt coated polyester sheets.

BACKGROUND

For over a century bituminous roofing membranes have been used in the United States to protect buildings, their contents and the occupants from the weather. The most common type of bituminous roofing membranes consist of two to five layers of felts and/or fabrics which, during application to the roof, are made to adhere together with bituminous material such as asphalt, coal, tar, or pitch. The felts and fabrics have contained numerous types of reinforcing materials, such as cellulose organic material, fiberglass, and polyester.

While felts and fabrics have served as well as could reasonably be expected of them, it has generally been recognized that mats consisting solely of polyester would provide substantially superior qualities. For example, polyester exhibits far greater pull-up resistance (i.e., resistance to being pulled or "peeled" away from a surface to which it has been fastened or adhered), and markedly better thermal shock resistance, than conventional fabrics and mats such as felt and fiberglass. It has long been observed that roofing installations subjected to high winds (50 miles per hour or greater) are prone to failure at locations in which sheets have been fastened to roofs by means mechanical fasteners such as nails, which have been used extensively in built-up roofing (BUR) systems. The wind in such situations tends to pull the sheet up away from the roof, causing nail heads to rip through the sheets such that the sheet is completely stripped away from the roof, with consequent loss of water tight integrity. Both inorganic and organic conventional materials have been found to be prone to such failures, whereas polyester, with its superior strength, is greatly resistant to being pulled away. Similarly, polyester has been found to perform much better than conventional materials when subjected to repeated thermal loadings, as by the sun. The constant heating/cooling cycles to which the sun subjects roofs causes continual expansions and contractions in the roof, leading to fatigue failure in sheets and asphalt and to splitting in the membrane itself.

Some success has been seen in using polyester mats installed on-site, by spreading fresh asphalt, applying a layer of polyester, and adding more asphalt on top, but this is time consuming and expensive, and quality control can be exceedingly difficult. A better solution is the use of pre-coated mats, termed "asphalt coated sheets" in the industry. Pre-coated sheets are typically available (in materials other than polyester) in roll form, ready to be laid out and fastened (as by nailing, for example) on a roof or other installation, either as a new membrane or as a re-cap for existing structure. Such a sheet containing polyester would be (and is) a highly-valued product. Thus far, however, no one has been able to reliably, economically, and effectively provide asphalt coated polyester sheets for use in roofing or other waterproofing installations. In order to make such sheets water resistant, and therefore useful, it is necessary to achieve the greatest extent of penetration possible of the asphalt into the mat, which is typically spun woven and therefore not at all air- or water tight on its own. Thus it is generally beneficial to coat the mat with a heated asphalt, which has a reduced viscosity is therefore better suited for penetrating the mat. Hot asphalt has a much lower viscosity than cold asphalt, and is thus much more capable of running down into, or penetrating, the polyester mat. Moreover, it is much easier to control the thickness, uniformity, and quality of an asphalt coating if it is applied while the asphalt is relatively inviscid. But polyester mats, especially those suitable for use in built-up waterproofing installations, typically exhibit relatively high shrinkage rates at even moderately elevated temperatures. Also, it has been observed that polyester mats coated with heated asphalts have experienced excessive shrinkage and wrinkling—so much that until the invention disclosed herein the width and flatness of the finished sheet has been entirely unsatisfactory for standard roofing purposes. This problem is aggravated in attempts to make the mats in conventional roofing line machinery, which is designed to pull strip mat material from rolls through various coating and cooling stages. The tension induced in the mats in such processes increases the tendency of the polyester to stretch in the longitudinal direction (the direction in which the mat is pulled by the machine) and aggravates shrinkage or "necking" in the transverse direction.

Some attempts have been made to use polyester mats in pre-fabricated asphalt coated membranes, but with limited success. One such attempt has involved the use of relatively thick (at least approximately 3/16–1/4") polyester panels to provide heavy membranes through the use of so-called modified bitumen or "mod-bit" processes. Even with the increased thickness of the panels, however, it has been necessary in such processes to move the panels very slowly through the coating line, to apply asphalt to the panel by dipping or pouring (instead of spraying or applying by means of a more economical nozzle), and to immediately cool the panels by immersing them in a water bath in order to avoid distortions such as wrinkling and necking. In addition, relatively large amounts of asphalt are coated onto the panels, so that the finished product is generally at least 1/4" thick. Such thick, heavy panels are extremely unwieldy and inconvenient to package, ship, handle, and install. Thus mod-bit processes are extremely cumbersome, slow, and substantially more complex and expensive than the method disclosed herein. For example, a typical mod-bit line comprising pulling machinery requires the use of a water bath and produces no more than 50 or at the most 100 feet of coated panel per minute.

Thus others interested in superior, economically viable built-up roofing have been forced to turn to the use of other materials, such as fiberglass or organic cellulose or felts for coated built-up roofing products. Some attempts by others in the roofing field to produce an improved roofing material are described in U.S. Pat. Nos. 3,741,856; 3,753,938 and 3,937, 640. U.S. Pat. No. 3,741,856 to Hurst issued Jan. 26, 1973, describes a bitumen waterproofing sheet which has a polyethylene support layer and a pressure sensitive adhesive backing. The Montague patent, U.S. Pat. No. 3,753,938, issued Aug. 21, 1973, describes a special roofing material which contains a mixture of bitumen, a synthetic elastomeric material which is predominantly chlorosulphonated polyethylene and fibrous material such as filaments of fiberglass or other synthetic bituminous roofing membrane comprising a base sheet of a synthetic polymer and one or more layers of bitumen. In addition, other roofing membranes have been developed in Europe in an attempt to meet the new requirements of modern roof construction and is the subject of patents in Luxembourg (No. 69480), France (No. 7505703) and Italy (20554A/75). (See also Impermeabilizzazione Delle Construzioni, Romolo Gorgati, 1974 pp. 63–64). The Gorgati patent, U.S. Pat. No. 4,368,228 issued Jan. 11, 1983 describes a bitumen mixture used in a waterproofing membrane obtained by coating different layers of reinforcing materials with the bitumen mixture.

It has also been difficult, for the reasons given above, to produce coated polyester sheets using rubber modified asphalts such as those described in my patent applications Ser. No. 08/978,243, filed Nov. 25, 1997, and entitled "Styrene Ethylene Butylene Styrene (SEBS) Copolymer Rubber Modified Asphalt Mixture"; and Ser. No. 08/978, 244, filed Nov. 25, 1997, and entitled "Plasticized Styrene Ethylene Butylene Styrene (SEBS) Copolymer Rubber Modified Asphalt Mixture." Sheets coated with such modified asphalts enjoy all of the advantages offered by those asphalts, including increased resistance to thermal stresses, ozone, and ultraviolet radiation, and may be produced by the methods and apparatus described in this application in the same manner as any other asphalt sheets, without need for modifying the process or apparatus. The specifications for my SEBS modified asphalts are hereby incorporated in this specification, as if set out fully herein, to supplement the processes and explanations provided herein, and to support my teaching of the art of making polyester sheets coated with specially modified asphalts.

It is sometimes advantageous to employ other asphaltic or bituminous mixtures as well, such as for example those modified by inclusion of various organic chemicals or other polymers. In U.S. Pat. No. 5,273,683, issued Dec. 28, 1993 to Dennis Krivohlavek, an exhaustive description of the various prior art approaches to modification of asphalt is presented.

Thus there exists a need for a rollable, lightweight, water-impervious, strong asphalt coated polyester sheet suitable for use in the roofing and waterproofing industries. There also exists a need for a simple, reliable, and cost-effective method for producing such sheets, and in particular for processes for making such sheets at high speed, with simple, economical equipment and without the need for cooling baths.

DISCLOSURE OF THE INVENTION

It is an object of the invention to provide a rollable, lightweight, water-impervious, strong asphalt coated polyester sheet suitable for use in the roofing and waterproofing industries.

It is a further object of the invention to provide a bituminous composite sheet to form a membrane using a fibrous, nonwoven or woven mat which is readily manufactured, structurally strong and provides increased service life when used in a roofing or waterproofing membrane.

It is a further object of the invention to provide a process or processes for producing such sheets.

It is yet a further an object of the invention to provide a process for making asphalt covered polyester or other sheets prone to substantial necking and wrinkling when coated with heated asphalt on conventional make-roll roofing lines without the necessity of making disruptive or prohibitively expensive modifications to the lines, thus saving time and money.

It is a further object of the invention to provide a process for making such sheets on conventional roofing lines in such a manner that the line may be used, without undue modification, for producing conventional asphalt coated roofing sheets from materials such as fiberglass or organic felt as well, and to do so without complex equipment, in economical fashion, without the need for liquid cooling baths.

It is a further object of the invention to produce asphalt coated polyester or similarly distortion-prone sheets according to the invention on a single coating machine or line at a rate in excess of 200 feet per minute.

It is a further object of the invention to provide a water impervious asphalt coated polyester or similarly distortion-prone sheet having a high degree of asphalt penetration by means of a process using heated asphalt with no necking or shrinking in the sheet, or at most acceptable necking, shrinkage, or wrinkling levels.

It is a further object of the invention to provide any of the afore described sheets using rubber- or otherwise-modified asphalts, and processes suitable for making sheets using them.

The invention provides such sheets and methods for making them. In general, the invention relates to new and improved bituminous sheet and method of production thereof, which is readily manufactured, flexible, extensible, fully coated by bituminous asphaltic material and having sufficient strength to be useful in reinforcing roofing and waterproofing membranes.

One aspect of the invention comprises a method of preparing an asphalt coated sheet for roofing, sealing, paving, waterproofing membranes and other related technologies. The method comprises the steps of heating asphalt to a temperature in the range of about 350 to 450 degrees F.; coating the asphalt onto a polyester mat having a thickness of from 0.5 to 1.5 millimeters and a fabric weight of from about 100 to about 300 grams per square meter to form a coated sheet in a coating process wherein the mat moves at a rate of about 30 to 100 meters per minute, the mat having a weight after application of the asphalt of about 800 to about 1200 grams per square meter; applying a parting agent to each side of said coated sheet; cooling said coated sheet; and winding said sheet on a finished roll. Preferably, the process of making asphalt coated sheets according to this aspect of the invention comprises the further step of marking the coated sheet after cooling with a marking agent and results in the production of finished rolls containing from 20 to 30 square meters per roll.

Generally preferred processes according to this aspect of the invention comprise the use of SEBS modified asphalts for coating the polyester mat. Such preferred processes include the formation of the modified asphalt by placing asphalt at 250 to 500 degrees F. in a low shear mixing vessel; adding from 1% to 25% by weight styrene ethylene butylene styrene (SEBS) copolymer to said vessel; and mixing said asphalt and copolymer at 250 to 500 degrees F. whereby an SEBS rubber modified asphaltic mixture results having a viscosity at 400 degrees F. of about 50 to 350 centipoise. Preferably, asphalts used in the formation of such modified asphalts have softening points of between about 50 degrees F. and about 225 degrees F. with penetration at 77 degrees F. of about 12 to about 100¹/₁₀ millimeters. The resultant composition preferably includes from about 1% to about 25% copolymer, and has a viscosity in the range of about 50 to about 350 centipoise at 400° F. This base mixture may then be mixed with up to 50% by weight of mineral fillers such as calcium carbonate in preparation for application to a polyester mat, as described more fully below.

Processes for making SEBS modified asphalts for use with process aspects of the invention are further described in my patent applications Ser. No. 08/978,243, entitled "Styrene Ethylene Butylene Styrene (SEBS) Copolymer Rubber Modified Asphalt Mixture"; and Ser. No. 08/978,244, entitled "Plasticized Styrene Ethylene Butylene Styrene (SEBS) Copolymer Rubber Modified Asphalt Mixture", the specifications of which have been incorporated in this specification. SEBS or other polymer-modified asphalts may be used in the processes and apparatus of this invention in the same manner as other asphalts, without special equipment or modifications.

Further aspects of the invention comprise asphalt coated sheets for roofing, sealing, paving, waterproofing membranes and other related technologies produced by any of the aforementioned processes. A particular example of such an embodiment of the invention comprises a nonwoven or woven polyester coated mat with a modified asphaltic material, said modified asphaltic material comprising of a mixture of roofing grade asphalts having a softening point of between about 50 degrees F. and about 225 degrees F. with penetration at 77 degrees F. of about 12 to about 100 $\frac{1}{10}$ millimeters combined with from 1% to 25% by weight styrene ethylene butylene styrene (SEBS) copolymer and from 1% to 50% by weight of a mineral filler. Preferably, such a sheet has a weight of about 100 grams per square meter to about 200 or more grams per square meter, and a thickness of from about 0.50 to about 1.5 millimeters; and the finished mat, with asphalt applied, has a weight of about one kilogram per square meter.

An alternative preferred method according to the process aspect of the invention is a method of preparing an asphalt coated sheet suitable for use in roofing, sealing, paving, waterproofing membranes and other related technologies in a coating machine comprising a coater, a metering device, and a mat puller, wherein the metering device is disposed between the coater and the mat puller and the mat puller is adapted to pull a strip of mat through the coater and the metering device at a selectable rate, the method comprising the steps of disposing a free end of the strip of polyester mat between nips of the metering device and within a feed for the mat puller, such that a length of the mat is disposed within the coater; pulling the mat through the coater with the mat puller; coating at least one side of the mat with asphalt as it passes through the coater; metering the asphalt by means of the metering device; and adjusting the rate at which the mat puller pulls the mat through the coating machine to control necking in the mat between the coater and the mat puller. To pull the mat faster results in greater tension within the mat, and therefore in general more pronounced necking, while reducing the rate at which the mat is pulled generally has the opposite effect. This aspect of the invention has been practiced with particular success in controlling necking in the mat by using mats comprising a continuous filament polyester and having a fabric weight of about 50 to about 1000 grams per square meter, a shrinkage at 200° C. of at least 0.2%, and a relative elongation at 180° C. and under an 8 daN load of at least 4%, and by adjusting the rate at which the mat puller pulls the mat through the coating machine so that a total tension in the mat does not exceed about 120–150 pounds per inch at any point between the coater and the mat puller. For some mats, tension loads may be allowed to approach 120 pounds per square inch—again, the higher the tension load in the mat, the higher in general is the rate at which the machine may produce coated sheet.

It has further been found advantageous in practicing such process aspects of the invention to employ in the coating machine a metering device which is adapted to bear upon the coated mat with selectable closeness, and to include within the process the step of adjusting the metering device such that it bears upon the mat with a closeness sufficient to provide a substantially complete, substantially even coating of said side of the mat with asphalt without causing necking in the mat. In such process it has been found beneficial to provide the metering device with at least one metering roller adapted for driven rotation at a selectable rate, and when practicing the method of the invention to adjust the rate of rotation of the metering roller relative to the rate at which the mat puller pulls the mat to control necking in the mat between the coater and the puller. In this way the metering roller may assist the mat puller in controlling tension loads, and therefore necking in the mat as asphalt is applied to it. Preferably, when practicing the invention in such a manner, the peripheral speed of a surface of the metering roller relative to a stationary reference relative to the coating machine is adjusted to between approximately 50% and approximately 200% of the rate at which the mat puller pulls the mat through the coating machine, and in particular to between about 90% and 130% of that rate. When using mats of the preferred type described above, excellent results have been obtained by adjusting the peripheral speed of the metering device to between about 102% and 110% of the speed at which the mat is pulled through the coating machine.

As has been discussed, it is desirable in producing asphalt coated polyester sheets according to the invention to heat the asphalt prior to applying it to the mat, in order to increase the penetration of the asphalt within the fibrous weave of the mat, and to improve control of the quality and evenness of the asphalt coating. In preferred processes according to the invention, the asphalt is heated to between approximately 250° F. and 500° F. before it is applied to the mat. More specifically, it has been found that when using the types of mat most commonly desired for use in making built-up roofing, such as the polyester mat described above, to heat the asphalt to between about 350° F. and 380° F. to reduce or prevent necking.

Another particularly beneficial aspect of this facet of the invention is the provision of the metering device with at least one rotating roller and of the coater with a reservoir, the reservoir containing a sufficient amount of asphalt to contact a surface of the roller, so that as the mat is pulled through the coater a side of the mat is coated with asphalt by means of the roller, using asphalt which adheres to the roller as the roller rotates in the reservoir. In coating machines comprising nozzles adapted for applying asphalt to one side of the mat, then, the coater may advantageously be arranged to coat a first side of the mat with asphalt by means of the application nozzle, while the second side is coated by the roller using asphalt from the reservoir in the manner described above.

Further beneficial steps in making asphalt coated sheets according to the various process aspects of the invention comprise the steps of applying a parting agent to each side of the sheet after it has been coated with asphalt, cooling the coated sheet; and winding the sheet into a finished roll for convenient storage, transport, and installation, as well as to provide convenient sales units.

Another preferred embodiment of the sheet aspect of the invention is an asphalt coated sheet suitable for use in roofing, sealing, paving, waterproofing membranes and other related technologies, the sheet comprising a continuous filament polyester mat having a thickness of from about 0.5 to about 1.5 millimeters and a fabric weight of about 50 to about 500 grams per square meter, a shrinkage at 200° C. of at least 0.2% and a relative elongation at 180° C. and under an 8 daN load of at least 5%, the mat coated on at least one side with asphalt; as previously discussed, such mats may advantageously be made using rubber modified asphalts as described herein and in the incorporated references. Such sheets according to this aspect of the invention preferably have weights following application of the asphalt of between about 800 to about 1600 grams per square meter.

BEST MODE FOR CARRYING OUT THE INVENTION

Asphalt, for the purposes of this disclosure, means any bituminous material or hydrocarbon, with or without additives, fillers, or aggregates, having sufficient insolubility in water and viscosity to be used advantageously in roofing, sealing, paving, or waterproofing, whether naturally occurring or distilled from petroleum or like products. In particular asphalt includes, without limitation, straight-run asphalts or asphalts modified by the addition of rubbers or other polymers, coal, tar, and pitch, as well as all bitumens and modified bituminous materials, whether oxidized or unoxidized. Bitumens such as asphalt having a softening point of between about 10° C. and about 107° C. (50° F. and about 225° F.) with penetration at 77 degrees F. of about 12 to about 100$\frac{1}{10}$ millimeters may be used as is or may be modified by the addition of rubber or other polymers, as for example SEBS copolymer (styrene ethylene butylene styrene). One formulation of SEBS copolymer used with great advantage in this invention is obtained from Imperbel America Corporation of 717 South 38th, P.O. Box 6761, Kansas City, Kans., 66106, having a product designation of I 175.

Polyester means any synthetic fiber containing substantial amounts of any one or more long chain polymer compounds of esters of dihydric acids (such as for example ethylene glycol) and terephthalic acid. A preferred polyester mat for use with the invention is a woven or nonwoven polyester mat composed of about 75% polyethylene terephthalate and about 25% acrylic copolymer latex having a weight of from about 50 to about 1000 grams per square meter, a thickness from about 0.50 to about 1.5 millimeters and preferably about 0.68 to about 1.2 millimeters, a shrinkage at 200° C. of at least 0.2% and a relative elongation at 180° C. and under an 8 daN load of at least 5%. Typically, the mat has a width of 1.0 to 1.2 meters, preferably 1.016±0.005 meters. Such mats are available under the trade name Trevira from the Hoechst Celanese Corporation of Spartanburg, S.C., under their product designations Spunbond 033/140, 033/170, and 033/180.

A strip of mat is any mat configured such that it has a length sufficient to make it work compatibly with coating machines of the type described herein. As a typical example, strip mats are typically made commercially available in rolls, with the mat having a length between 10 and several thousand meters. Within the contemplation of this disclosure, such strips comprise polyester or any other material suitable for the purposes described herein and having shrinkage, necking, elongation, and/or wrinkling temperatures similar to the polyesters described herein.

Figure 1:
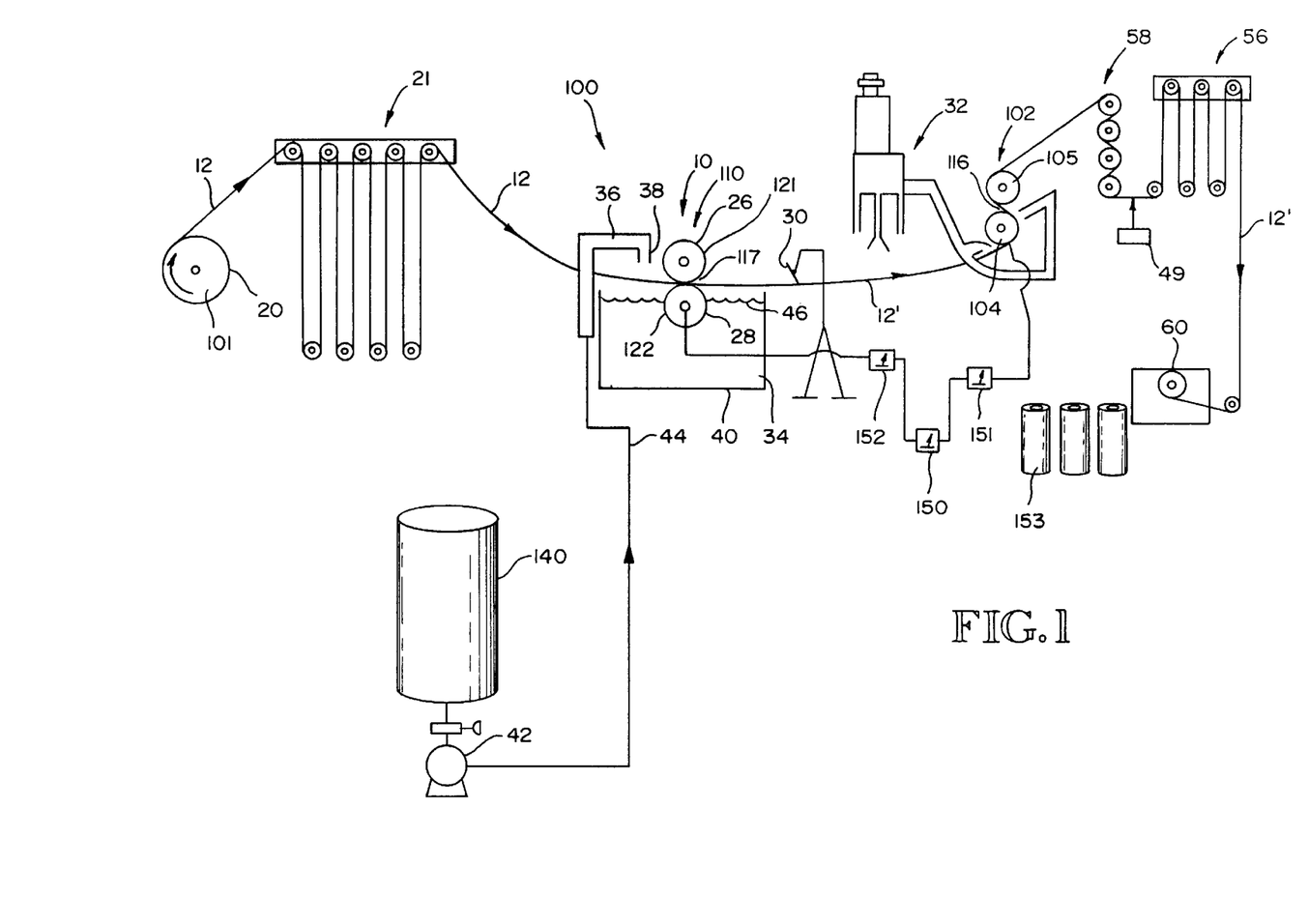
FIG. 1 is a schematic flow diagram showing a preferred coating and preparation method and apparatus according to the invention.

Turning now to the drawings, a preferred process for making asphalt coated polyester or similarly distortion-prone sheets according to the invention is described as illustrated in FIG. 1. Mat 12 is placed on storage roller 101 of coating machine 100, which further comprises dry looper 21, coater 10, metering rollers 26 and 28, parting agent application station (or "sand or soap application station") 32, mat puller 102 comprising sand drum 104 and back-sanding drum 105, cooling drums 58, marking station 49, finish looper 56, and roll winder 60. In the embodiment shown, coater 10 is disposed between storage roller 101 and metering rollers 26 and 28, and pull rollers 102 are located downstream (from the standpoint of the movement of the mat through the coating machine) from metering rolls 26 and 28, on the opposite side of coater 10 from storage roller 101. As shown in the Figure, master feed rolls 20 of the uncoated mat are unwound through dry looper 21, through nips 117 of metering device 110, and through feed 116 of mat puller 102; and are pulled through coating machine 10 at speeds in the range of about 50 to 750 feet per minute or more, preferably at speeds greater than 200 or 300 feet per minute. Coater 10 applies asphalt from tank 140, which has optionally been heated in accordance with the disclosure herein, to either one or both sides of the mat, and the mat is squeezed between the nips of metering rolls 26 and 28 to evenly distribute the asphalt mixture upon the mat, forming the sheet. Optional scraper 30 positioned downstream of the metering rolls 26, 28 may be used to assist in distributing the asphalt mixture evenly, or metering it, upon the mat. Asphalt is introduced to the coater 10 through feed line 44 and distribution or application nozzle 38, preferably at about 250° to 500° F. and particularly between about 350° to 380° F. Asphalt bath 34 is maintained at level 46 in reservoir 40 of the coater, either by excess runoff from application on the upper surface, by separate supply, or both, at approximately the same temperature as the asphalt applied through nozzle 38. The asphalt is thus applied to the upper surface of mat 12 through nozzle 38 and to the lower surface of mat 12 by metering roll 28 from bath 34.

In preferred processes, once coated mat 12', now referred to as a "sheet", has passed out of the coating section a light film of sand or soap is applied to one or both sides of the mat at parting agent application station 32 to serve as a parting agent in order to prevent rolled sheets from adhering to themselves. As sheet 12' passes further down the line, it is allowed to cool on cooling drums 58 and finish looper 56, and its width checked to insure that no more than an acceptable amount of necking, or transverse shrinking—typically about ¼ inch—has taken place due to distortions of the polyester fibers under the heat absorbed from the warm asphalt. As a final step, lay lines for guiding installation of the sheets in roofing or other waterproofing applications are marked on the sheet at marking station 49 in a preset pattern using a white latex paint or other suitable marking agent.

When the finished sheet reaches the winding machine 60, it is rolled into convenient sized rolls 153, typically containing 20 or 30 square meters (216 or 324 square feet). The corresponding roll lengths would be about 22 or about 33 meters (72 feet or 108 feet) respectively. The rolls are then packaged for shipment and weigh between about 23 and about 40 kilograms (about 50 and 90 pounds; about 800 to about 1600 grams per square meter) depending on the level of filler used, the amount of asphalt added as coating (partially controlled by adjustment of the metering device, as herein described), the original weight of the mat, and the square measure of the roll. Typically, the sheet has a tensile strength in the machine direction (i.e. the direction in which the mat/sheet is pulled through the coating machine) of about 10,000 to about 18,000 grams per centimeter (60 to 150 pounds per inch) and 30 to 50% maximum elongation.

A critical aspect of the production of asphalt coated polyester sheets is the combination of temperature and tensile stress to which the sheets or mats are subjected during the coating process. Polyester mats of the type suitable for use in roofing or waterproofing applications are typically susceptible to extreme distortions (including strains or elongations of up to 50% or more) under the temperatures (typically 250° F. to 500° F.) at which asphalt coatings are applied, even when under such temperatures the mats are subjected to only moderate tensile loads such as those which might be encountered in the pulling process in a conventional roofing line mat coating machine. Under such extreme distortions the mats/sheets are prone to severe wrinkling and necking, often to the extent that the distorted polyester mats/sheets are rendered unsatisfactory for standard roofing or waterproofing applications. Thus it has been a principal object of the invention to provide a process compatible with conventional roofing line machinery whereby polyester mat may be coated without causing unwanted necking, wrinkling, or elongation in the mat, or otherwise destroying the utility of the finished sheet product—and of maintaining fully satisfactory sheet dimensions for standard applications.

In most roofing line mat-coating processes, mat material is pulled through and out of the coating section of a mat-coating machine by a mat puller comprising one or more sets of rollers. In a conventional machine of the type from which the machine depicted in FIG. 1 is derived (the machine of FIG. 1 is only in the broadest sense similar to such standard machines), motive power for the mat is provided by mat puller 102, which comprises sand drum 104 and back-sanding drum 105 and, optionally, at a secondary level by winding machine 60. Puller 102 pulls the mat from storage roll 101 through dry looper 21 and coater 10. Thus, the puller pulls the mat—that is, it places the mat under substantial tensile stresses—in those sections of the machine, including coater 10 and parting agent application section 32, in which the mat, having had heated asphalt applied to it and having just been allowed to begin cooling, is at its peak temperature and thus is in its state of maximum susceptibility to deformations (such as wrinkling and necking) under tension. It is therefore critical to control very carefully the level of the tensile load (the stress) and strain to which the mat is subjected in these stages of the coating process. One way in which this can be done is by controlling the rate at which the mat puller pulls the mat through the machine, and the force with which it does so: the harder the puller pulls on the mat, the more power it applies to pulling and the greater the rate at which it pulls, the greater will be the tension (and subsequent distortions) in the mat. Control of the power and rate with which a motor pulls the mat can be accomplished, as will be appreciated by those having experience in operating roofing lines of the type described, by a wide variety of conventional means: by selecting a puller motor of appropriate power, and by controlling the rate at which it operates—by means of a throttle, for example, in the case of internal combustion or turbine-driven engines, or by a rheostat or other current-varying device in the case of electric motors.

Figure 2:
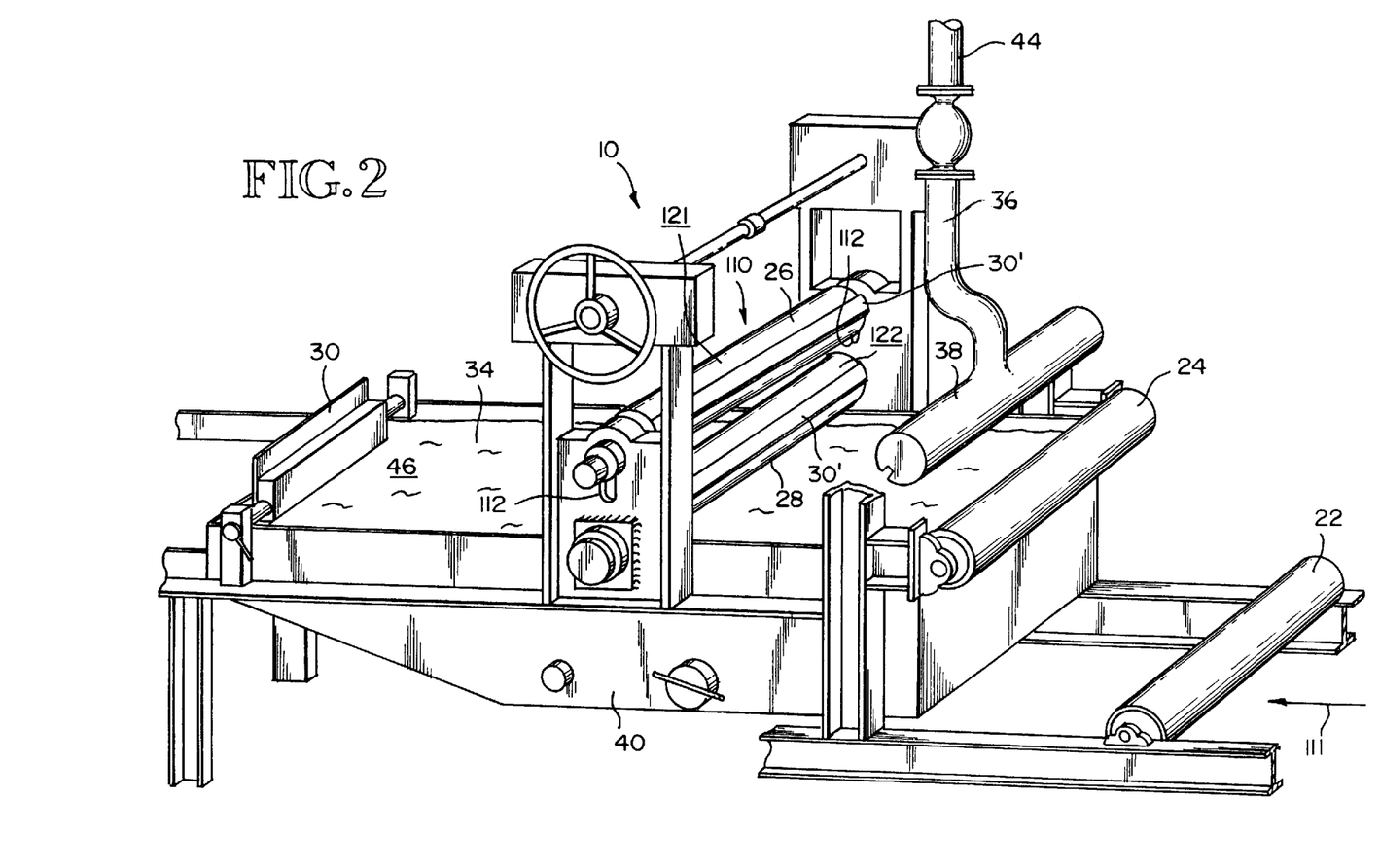
FIG. 2 is a schematic perspective view of a preferred embodiment of a coating mechanism useful in this invention.

The tension in the mat will also be affected by the amount of resistance the mat meets in moving through the machine, and in particular through the coater. The amount of resistance supplied by such other machine components is relatively difficult to predict and to control. For example, within the coater the amount of resistance applied to the mat as it is pulled through the machine will depend not only upon the rate with which it is pulled, but on the drag induced by the coater itself—by the applicator, if the asphalt applicator actually contacts the mat, by the viscosity and thickness of the applied asphalt, and by the metering device, among others. The amount of drag induced by the metering device, for example, will depend upon the closeness with which the rollers, scrapers, etc. of the device bear against or contact the mat, as well as the viscosity and adherence or "stickiness" of the asphalt. If the metering device includes one or more powered rollers (as shown in FIGS. 1 and 2), the amount of resistance induced by the coater will also depend upon the rate at which the rollers rotate. Thus a particularly advantageous facet of the invention is to provide metering device 110, which comprises metering rollers 26 and 28, with selectably controllable motive power such that the metering device can assist puller 102 in pulling the polyester sheet/mat through the coating machine, and with a capability of bearing on the mat with selectable closeness.

The bearing, scraping, or gripping surfaces of metering devices adapted for helping coat mat with asphalt are typically not static with respect to the mats they coat. Thus for example the metering rollers shown in FIG. 1 typically rotate, in performing their function of helping spread asphalt on mat 12 and helping the asphalt to penetrate the mat to the fullest possible extent, at a rate faster or slower than that at which the mat moves through their nips—in other words, the surfaces of the rollers slip on the asphalt layered on the mat, or the mat slips on the roller surfaces. Thus, by making metering rollers 26 and 28 rotate and controlling the speeds at which they do so, tension in mat 12 both before and after its passage through the nips of the metering rollers may be affected: by increasing the speed of metering rollers 26 and 28, tension and strain in the mat as it enters the coater (on the "upstream" side) may be increased, and that on the downstream side (as it leaves the coater) decreased; decreasing the speed of the metering rollers generally induces the opposite effect, if the speeds of pull rollers 102 and winding machine 60 are left unchanged. The same effect may be accomplished by adjusting the degree to which the metering device bears upon the mat/sheet as it passes through the metering device, as for example by adjusting roller 26 in FIG. 2 so that it is held closer to roller 28, or by a combination of the two actions. This tension-modifying effect, properly controlled, can be used to control or eliminate distortions, including necking and wrinkling, in the mat. As previously explained, this may be accomplished, when using preferred mats comprising a continuous filament polyester and having a fabric weight of about 50 to about 1000 grams per square meter, a shrinkage at 200° C. of at least 0.2%, and a relative elongation at 180° C. and under an 8 daN load of at least 5%, by adjusting the rate at which the mat puller pulls the mat through the coating machine so that a total tension in the mat does not exceed about 120–150 pounds per inch at any point between the coater and the mat puller. A load "per inch", within the meaning of this specification, is a force (as for example in pounds) applied to a linear inch of mat or sheet material across the width of the mat in the transverse or non-machine direction (depicted by arrows 170 in FIG. 3). If for example the sheet shown in FIG. 3 were pulled along edge 120 by a load evenly distributed along that edge, a load per inch equal to the total distributed load divided by the width of the sheet in inches would result. For some mats, tension stresses (which are a well-understood engineering quantity based on distribution of a load across a unit area, determined by dividing the applied load by the cross-sectional area—the width multiplied by the thickness—of the loaded mat) may be allowed to approach 120 pounds per square inch or more—again, the higher the tension load in the mat, the higher in general is the rate at which the machine may produce coated sheet. Tension levels in the mat may be monitored, measured, or controlled by any suitable conventional means, and will lie well within the skill of the machinery builder or operator.

It has been found that acceptable tension levels, ergo acceptable necking levels, may be obtained in coating preferred asphalts according to the invention, in utilizing the processes involving metering roller(s) as described, by adjusting the speed of the mat puller and the speed of the metering rollers, if powered metering rollers are supplied, and observing the results in the sheet as it leaves the coater. By manipulating the speeds of the puller and/or the metering device while monitoring the condition of coated sheet passing out of the coater and through the cooling section of the machine, a satisfactory balance may easily be achieved for any given asphalt temperature, thickness, and viscosity combination on any given machine. It has been found that in many roofing line machines. adjustment of the metering rollers such that the peripheral speed of the bearing surface of the roller, considered relative to a stationary reference such as the coating machine, is between approximately 50% and approximately 200% of the rate at which the mat puller pulls the mat through the coating machine, and preferably between approximately 90% and approximately 130% of the rate at which the mat puller pulls the mat.

One particularly successful arrangement for controlling and balancing the rate at which the mat puller and metering device pulls (or pushes) on the mat/sheet as it passes has been to provide the puller and the metering devices with independent rate controls, so that the speed of the devices may be independently set, while overall line speed is controlled by an overall control linkage governing both the independent mat puller and metering device rate controllers, so that the rates of the pullers and metering device may optionally be controlled together. Thus for example satisfactory puller and metering device rate might independently be obtained, and overall line speed thereafter increased by proportionally varying the two rates together. Suitable controls are a relatively simple matter to arrange, either with internal combustion engines (through a set of linked independent throttles) or electric motors (through a set of linked independent rheostats). The determination of suitable control means and methods will not trouble the skilled designer of such systems. All he or she need do to produce satisfactory sheets is to adjust the mat puller and metering device speeds, as described, while monitoring the condition of the sheet exiting the coater, and to control overall line speed by means of the global system control. For example, in FIG. 1 the speed of mat puller 102 is controlled by throttle or rheostat (or equivalent device) 151; the speed of metering rollers 26 and 28 is controlled by throttle, rheostat, or equivalent 152, and overall line speed is controlled by control linkage 150.

FIG. 2 is a schematic perspective view of a preferred embodiment of a coating mechanism useful in this invention. Coater 10 comprises metering device 110, which comprises metering rolls 26 and 28 and scrapers 30 and 30'; reservoir 40 containing bath 34 at level 46; and application or distribution nozzle 38. In the Figure scraper 30 is disposed to scrape or meter sheet 12' (not shown) as it leaves the coating section; scrapers 30' are disposed to meter the amount of asphalt carried on rollers 26 and 28. Uncoated mat enters the coater by passing beneath roller 22 and over roller 24 in the direction of arrow 111, passes beneath application nozzle 38, which coats its upper side or surface with asphalt, and passes through the nips of metering rollers 26 and 28. As it passes through the nips of metering rollers 26 and 28 roller 28, the lower surface of which is immersed or in contact with asphalt bath 34, coats the bottom side of the mat with asphalt; while rollers 26 and 28, in conjunction with scraper 30, spread the asphalt evenly on the mat and help the asphalt penetrate between the fibers of the polyester mat. The position of metering roller 26 is adjustable by means of slots 112, so that the gap between or nips of metering rollers 26 and 28 may be selected in order to control the spreading and penetration of asphalt on the mat and the bite or grip of the metering rollers on the mat as it passes, such that tension in the mat/sheet may be controlled. In the Figure metering rollers 26 and 28 are depicted in a relatively open position.

Figure 3:
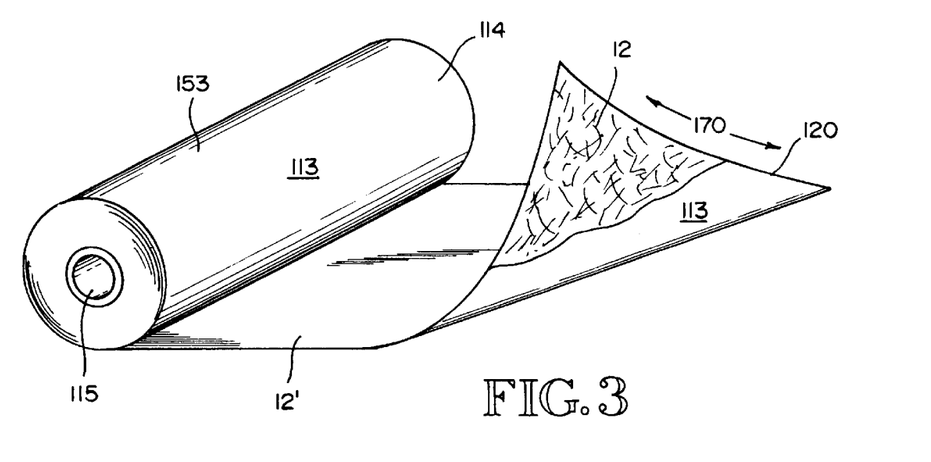
FIG. 3 is a schematic perspective view of a preferred embodiment of an asphalt coated sheet according to the invention.

FIG. 3 is a schematic perspective view of a preferred embodiment of an asphalt coated sheet according to the invention. Sheet 12' comprises mat 12 and asphalt coating 113, to which parting agent 114 (shown as sand or like particulate matter) has been applied. Sheet 12' has been rolled onto spool 115 for convenient handling, storage, and installation.

In the Figures mat puller 102 is depicted as one or more sets of rollers. It is considered, however, that any conventional means for pulling mats through machinery will work satisfactorily with, and lies within the scope of, the invention. For example, a puller comprising a single roller and a flat plate, or a set of gripping feet such as those found on conventional sewing machines are equivalent for purposes of the invention, and will answer satisfactorily. The feed for a mat puller, within the contemplation of this specification, is whatever means the mat puller comprises for accepting the mat/sheet as it moves through the coating machine. For example, the feed for puller 102 in FIG. 1 is nips 116 of rollers 104 and 105. The selection and incorporation of satisfactory pulling means for use in coating machinery and methods according to the invention will not trouble the designer of such machinery, once he or she has been armed with the disclosure of the invention.

Likewise, although metering device 110 is depicted as a set of rollers, any satisfactory means will serve. For example, the metering device might comprise a single powered roller, rotatable at a selectable rate, and a blade or scraper adapted to control the amount and distribution of asphalt applied to the polyester mat. Any such equivalent structures are considered to lie within the scope of the invention.

To "meter" a coating, within the meaning of this specification, is to control a spread of a coating upon a surface of a mat (as by "squeegee" action), and/or to control the thickness of the coating, regardless of the mechanism by which such spreading or thickness control is achieved, and a metering device is any device which performs either or both of those functions.

As previously mentioned, filler materials may be incorporated to modify the properties of bituminous materials applied to sheets according to the invention. Fillers such as limestone (calcium carbonate), when added in comminuted form, may add weight or bulk, improve strength, or modify other properties, and are well known in the art. In place of limestone, any other suitable mineral-dust filler may be utilized. The selection of such fillers will not trouble the skilled maker of asphalts. It has been noted, however, in practicing the invention, that in some conditions it is advantageous not to include fillers in asphalts used in making sheets according to the invention. The addition of fillers can affect the temperature of the asphalt as it is applied to the mat, with consequent effects (as herein elsewhere described) on the tension placed on the mat/sheet as it moves through the coating machine (in general, the more viscous the asphalt, the greater the tension). Thus in some instances superior results have been achieved by not adding fillers to the coating asphalt.

EXAMPLE

A preferred polyester mat of the type described above, comprising about 75% polyethylene terepthalate and about 25% acrylic copolymer latex and having a weight of from about 100 to about 300 grams per square meter, a thickness from about 0.68 to about 1.2 millimeters, a fabric weight of about 100 to about 300 grams per square meter, a shrinkage at 200° C. of at least 0.2%, a relative elongation at 180° C. and under an 8 daN load of at least 5%, and a width of about one meter is disposed in the coating machine depicted schematically in FIG. 1, as described above. Pull roller 104 has a diameter of 42 inches, roller 105 a diameter of 24 inches, and metering rollers 26 and 28 8.25 inches each. Pull rollers 104 and 105, which are electrically powered, are adjusted so that they are driven at 9.1 RPM and 15.9 RPM respectively, by means of puller rheostat 151. As the mat passes through the coating section SEBS modified asphalts as described herein and in the incorporated references is applied at between 350° F. and 380° F. to the upper surface of the mat by distribution nozzle 38 and to the bottom of the mat by metering roller 28 by back-coating the mat with asphalt from bath 34. The nips of electrically powered metering rollers 26 and 28 are adjusted such that an even coating of asphalt just thick enough to prevent any fibers in the mat from showing through results, and the rate of the metering rollers are adjusted by means of metering rheostat 152 to rotate at between about 47.2 to 50.9 RPM, so that surfaces 121 and 122 of the rollers rotate between 2 and 10 percent faster than the mat moves between them. Sand is applied as a parting agent in parting agent applicator 49; the sheet is allowed to cool at ambient temperature (65–72° F.) for approximately one minute; and is wound into a finished roll, cut, and set aside for delivery. Necking of less that ¼ inch, with no discernable wrinkling, results as coated sheet is produced at 200 feet per minute. Thereafter overall line speed may be controlled by means of system rheostat 150.

While this invention has been described with reference to specific embodiments, it will be recognized by those skilled in the art that variations are possible without departing from the spirit and scope of the invention, and that it is intended to cover all changes and modifications of the invention disclosed for the purposes of illustration which do not constitute departure from the spirit and scope of the invention.

INDUSTRIAL APPLICABILITY

The bitumen coated sheet of this invention finds use in the roofing and waterproofing of buildings, foundations, and other structures.

I claim:

1. A sheet comprising: a single layer of nonwoven or woven polyester mat coated with a modified asphaltic material, said modified asphaltic material comprising a mixture of roofing grade asphalts having a softening point of between about 50 degrees F. and about 225 degrees F. with penetration at 77 degrees F. of about 12 to about 100 $\frac{1}{10}$ millimeters combined with from 1% to 25% by weight styrene ethylene styrene (SEBS) copolymer and from 1 to 50% by weigh of a mineral fiber.

2. The sheet of claim 1 wherein said nonwoven or woven polyester fabric has a weight of about 100 grams per square meter to about 200 or more grams per square meter.

3. The sheet of claim 1 wherein said fabric has a thickness of from about 0.50 to about 1.5 millimeters.

4. The sheet of claim 1 wherein said finished mat has a weight of about one kilogram per square meter.

5. An asphalt coated sheet suitable for use in roofing, sealing, paving, waterproofing membranes and other related technologies, the sheet comprising a single layer of continuous filament mat having a thickness of from about 0.5 to about 1.5 millimeters and a fabric weight of about 50 to about 1000 grams per square meter, a shrinkage at 200° C. of at least 0.2% and a relative elongation at 180° C. and under an 8 daN load of at least 5%, the mat coated on at least one side with asphalt.

6. The asphalt coated sheet of claim 5, wherein the mat comprises polyester.

7. The asphalt coated sheet of claim 5, wherein the asphalt comprises rubber modified asphalt.

8. The asphalt coated sheet of claim 5, the sheet being coated with asphalt on two sides such that the weight of the sheet after application of the asphalt is between about 800 to about 1600 grams per square meter.

* * * * *